March 3, 1970 J. BELART 3,498,622
DUST CAPS FOR FLUID CYLINDERS
Filed Aug. 31, 1967
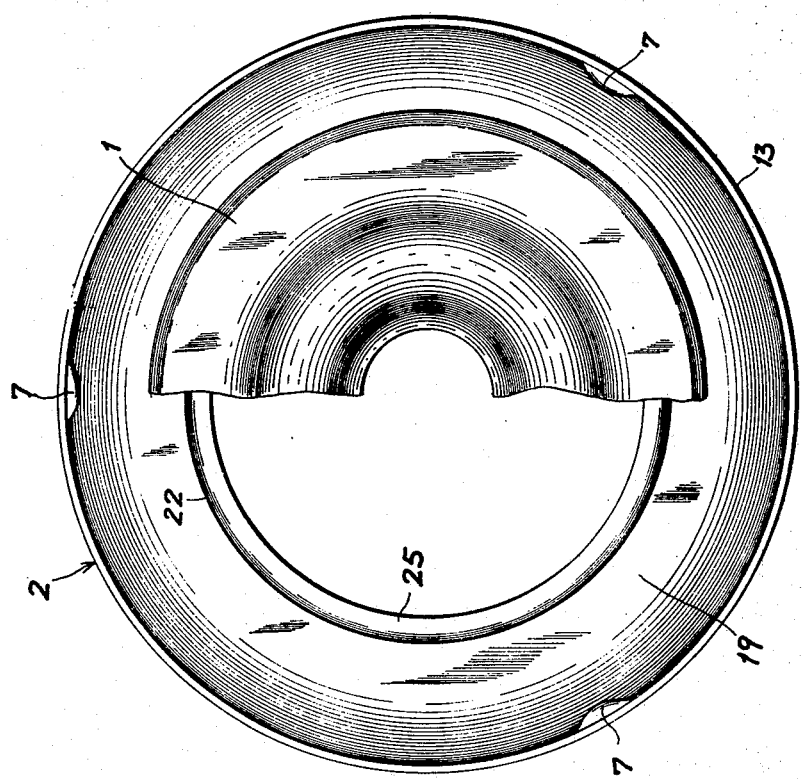
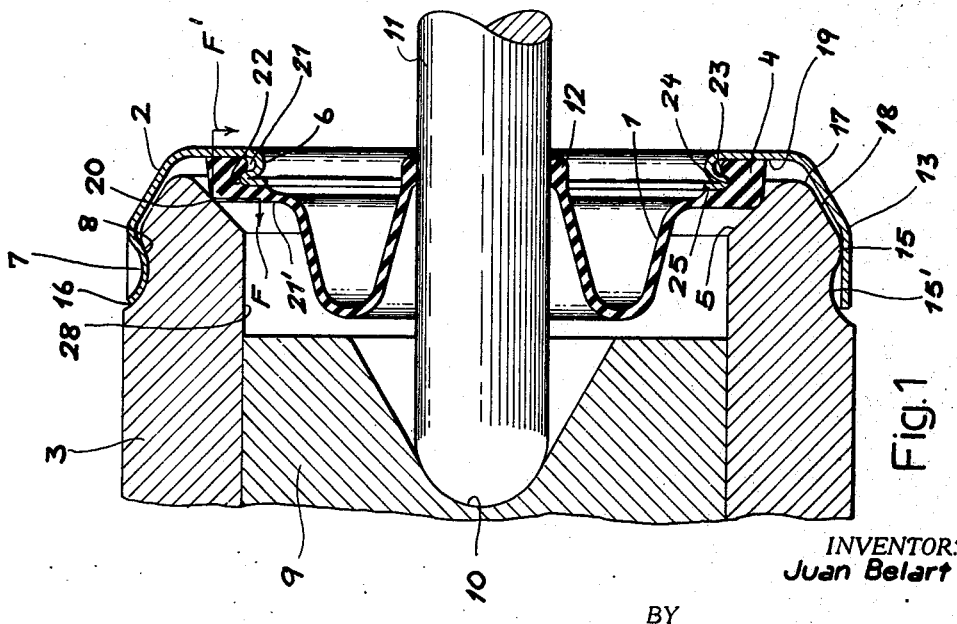
INVENTOR:
Juan Belart
BY
Karl G. Ross
Attorney

United States Patent Office 3,498,622
Patented Mar. 3, 1970

3,498,622
DUST CAPS FOR FLUID CYLINDERS
Juan Belart, Walldorf, Germany, assignor to Alfred Teves Maschinen- und Armaturenfabrik KG, Frankfurt am Main, Germany, a corporation of Germany
Filed Aug. 31, 1967, Ser. No. 664,861
Claims priority, application Germany, Sept. 24, 1966,
T 32,132
Int. Cl. F16l *15/32;* F16j *3/00*
U.S. Cl. 277—170    4 Claims

ABSTRACT OF THE DISCLOSURE

A dust cap for a fluid cylinder (e.g., a wheel-brake or master cylinder of an automotive brake system) wherein the cylinder wall is provided externally with a groove engageable with spaced protuberances on the inner surface of a thin metal sleeve fitted over the opening of the cylinder and having an inwardly turned inner peripheral flange engaging the inner surface of an annular bead of a rubber cuff and retaining this bead against the frustoconical inner surface of the cylinder. The central portion of the elastic cuff is dimensioned to hug a piston rod or a cap connected therewith.

---

My present invention relates to dust caps and other protective closures for open-ended fluid cylinders and, more particularly, to anticontamination shields adapted to close the space between a piston rod or other relatively movable cylinder member and the wall of a cylinder receiving same.

While numerous configurations of dust caps for closing open-ended cylinders and especially fluid-responsive cylinders of the type used in automotive systems are known, none has been satisfactory in all respects. For example, the cylinders using such closures may be wheel-brake cylinders of hydraulic or pneumatic automatic-brake arrangement and may be required to exclude liquid and solid contaminants for the cylinder while affording sufficient flexibility to permit movement of a piston rod, connecting link or the like. Wheel-brake cylinders, however, are subjected to extremes of contamination and temperature so that the seals must be capable, on the one hand, of withstanding organic and inorganic liquids, entrance of particles and other contaminating materials, such as the salts used to treat road surfaces in the winter and, on the other hand, must be capable of withstanding the high temperatures generated in brake operations and the low temperatures to which standing vehicles may be exposed during cold weather. Conventional methods of mounting elastomeric sleeves, caps or glands on the open end of fluid-responsive cylinders have frequently failed because of these extreme conditions and heating of the attaching parts. When, for example, an elastomeric cap is pushed over a peripheral lip or ridge of the cylinder, distortions cause loosening of the grip of this bead which is expanded over a relatively large diameter. Furthermore, repeated removal of the usual inwardly turned bead of the sleevelike portion of this cap causes deterioration, loss of elasticity and failure of sealing power. On the other hand, there has been suggested an arrangement in which the inner periphery of a resilient sleeve bears inwardly upon a metal collar affixed to the piston. In this case, also, the outer periphery of the ringlike sealing caps or membrane was anchored in a peripheral groove of the cylinder housing with all of the difficulties mentioned earlier.

It is, therefore, the principal object of the present invention to provide an improved dust cover for open-ended pistons in which the aforementioned disadvantages can be obviated.

More specifically, it is an object of this invention to provide a dust-cover assembly with improved and longer-lasting sealing engagement of the cylinder in spite of repeated removal operations, etc.

I have now found that the frictional stresses and abrasive operations which have hitherto damaged the inwardly turned peripheral flange of outer rim of rubber dust caps or seals can be eliminated with a sealing assembly in which an annular relatively incompressible dust cap fits over the outer periphery of the open end of a fluid-responsive cylinder (e.g., the wheel-brake cylinder or master cylinder of an automotive brake system) and cooperates with a recess in the outer periphery of this cylinder so that the metallic cap is elastically urged onto the cylinder, the assembly further comprising an elastic membrane whose annular configuration includes a beaded outer rim of enlarged cross-section which is retained against an inner face of the cylinder (preferably the beveled mouth thereof) by an axially inward turn.

The inner peripheral rim of the metal cap receives the outer peripheral bead of the elastomeric membrane. The latter forms a cuff hugging the rod and has an outer diameter approximately that of the cylinder bore.

According to a more specific feature of this invention, the outer periphery of the cylinder is provided wtih an annular ridge while the inner surface of the sheet-metal cap is formed with a plurality of equispaced, angularly spaced protuberances pressed out of the sheet metal and engageable behind this ridge to elastically retain the metal sleeve upon the face of the cylinder. At the inner periphery of this cap, I provide, along the inwardly turned rim, a radial flange which is spaced from the web of this cap and defines therewith an outwardly open annular groove into which projects an inwardly turned bulge of the rubber member. The inner periphery of the elastomeric member of the dust cap can, of course, hug a piston or connecting rod directly or via a metal sleeve as has been suggested heretofore.

The above and other objects, features and advantages of this invention will become more readily apparent from the following description, reference being made to the accompanying drawing in which:

FIG. 1 is an axial cross-sectional view through the sealing assembly of the present invention; and FIG. 2 is a side-elevational view of the dust cap upon its removal from the cylinder.

In the drawing, I show an assembly for closing the end of a wheel-brake cylinder 3 whose piston 9 has a socket 10 receiving a connecting rod 11. The latter is hugged by the inner peripheral cuff 12 of a rubber diaphragm or cuff 1 on closing the open right-hand end of the cylinder 3 and forming part of a cylinder assembly with an annular protective cap 2. The latter is composed of a rigid but resiliently flexible material, i.e., drawn from sheet metal or possibly molded from a heat-resistant high-rigidity plastic of high compressive strength. The cap 2 has a generally cylindrical outer peripheral flange 13 adapted to fit snugly over a ridge 15 along the outer periphery of the cylinder 3. Behind the ridge 15, there is formed a continuous peripheral recess 8 which provides the ridge 15 with a rearwardly turned flank 15' behind which engage the three radically inwardly projecting spherically rounded protuberances 7 pressed into the drawn-metal cap or molded into the plastic cap. The mouth of the cylindrical portion 13 of the cap is represented at 16 and has a diameter slightly greater than the diameter of the inner edge 17 of the bevel 18, flaring outwardly to the ridge 15 along the outer periphery of the cylinder 3. Thus, the cap 2 may be axially pushed onto the bevel 18 which acts as a cam elastically spreading the cap which is deformed into triangular configuration until the protuberances 7 engage behind the flank 15' of ridge 15. The protuberances 7 are dimensioned to draw the cap 2 axially inwardly so that the axially inner surface 19 of the metal cap, which forms a web lying in a radial plane with respect to the axis of the cylinder, is closer to the inwardly convergent beveled flank 5 at the mouth of the cylinder than the axial thickness of a bead 4 along the outer periphery of the member 1. The bead 4 is generally of rectangular cross-section and has a right-angled corner edge 20 at the junction between the bead 4 and a surface 21 of the elastomeric diaphragm 1 which is parallel to the web 19. This annular corner 20 forms an edge which is compressed by the metal cap 2 against the beveled flank 5. Beyond the diaphragm portion 1, the bead 4 extends axially outwardly and bears upon the surface 19 to augment the sealing operation and define an axially open recess (generally designed 21) of a diameter less than the outer diameter of a radially outwardly turned flange 22 of the inwardly turned inner periphery 6 which, in effect, is flared radially outwardly but axially inwardly with respect to the cylinder. Thus the flange 6, 22 is hugged tightly by the inner surface of the bead 4.

Additionally, it has been found to be advantageous to make the bead 4 sufficiently elastic so it forms an inwardly turned ridge 23 or to preform the bead 4 with such a ridge so that a radial recess is provided at 24 to accommodate the flange. The flange 6, 22 has an inwardly turned portion 25 which lies parallel to the web 19 and ensures surface engagement with the web portion 21' of the elastomeric cuff 1. Thus, when axial force is applied inwardly by the cap 2, as represented at F, and the bead 4 bears against the surface 5 at the corner 20, a leverlike action forces the bead at F' radially against the flange 6, 22 to increase the sealing force.

The diameter of the flange 6, 22 corresponds essentially to the diameter of the cylinder bore 28 while the flank 25 and the bent edge 24 prevent tearing of the rubber member 1 by avoidance of sharp edges on the metal cap 2. The assembly has a significant advantage over earlier systems in that the rubber member is removed from abrasive and thermal contact with the cylinder 3 while the cap 2 can have a relatively small thickness, thereby avoiding any significant heat transfer to the rubber member. Repeated mounting and dismounting of the assembly is possible without distortion of the rubber part which, therefore, does not undergo any substantial mechanical stress and does not release because of declining elasticity with time.

I claim:

1. A closure assembly for an open-end fluid cylinder having an outer peripheral groove proximal to the mouth of the cylinder, a circumferential ridge between said groove and said mouth, and an outwardly divergent frustoconical bevel along the inside of said mouth, said assembly comprising:
  a stiff annular cap axially seated on the open end of said cylinder, said cap including
    a generally cylindrical portion surrounding said end of said cylinder and reaching axially behind said ridge,
    a plurality of angularly equispaced inwardly deformed protuberances provided in said cylindrical portion and elastically seated in said groove and conforming to the latter,
    an annular web overchanging said bevel and lying generally in a plane perpendicular to the axis of said cylinder and defining the inner periphery of said cap, said web being integral with said cylindrical portion, and
    an inwardly turned bead formed on said flange along said inner periphery; and
  a resiliently compressible sealing cuff having an outer peripheral bead retained by said cap under compression against said cylinder, said bead being formed with an
    inwardly open annular recess in a plane parallel to the plane of said web and receiving said flange while hugging same,
    an inwardly turned ridge along said recess and lodged between said flange and an adjacent part of said web,
    a surface parallel to said planes and resting flatly against an inner surface of said web, and
    a circumferential edge formed between two substantially perpendicular surfaces opposite said inwardly turned ridge and bearing upon said frustoconical bevel.

2. The assembly defined in claim 1 wherein said cap is composed of metal and is all of a single wall thickness, said flange having a diameter approximately the diameter of the cylinder wall and being formed with a generally flat surface lying in a plane perpendicular to the axis of said cylinder and bearing against a portion of said cap inwardly of said bead.

3. The assembly defined in claim 2 wherein said bead is of generally rectangular cross section, said cuff having an inner periphery engaging a rod extending into said cylinder through said mouth.

4. The assembly defined in claim 3 wherein three such protuberances are provided along said cylindrical portion.

References Cited

UNITED STATES PATENTS

| | | | |
|---|---|---|---|
| 2,565,571 | 8/1951 | Naumann | 277—189 X |
| 2,926,938 | 3/1960 | Ratti | 277—186 |
| 3,128,105 | 4/1964 | Liebig | 277—189 X |

SAMUEL ROTHBERG, Primary Examiner

U.S. Cl. X.R.

74—18.2; 277—187, 189